United States Patent
Awad (10) Patent No.: US 9,730,197 B2
(45) Date of Patent: Aug. 8, 2017

(54) COMMUNICATION SYSTEM

(71) Applicant: NEC Corporation, Minato-ku, Tokyo (JP)

(72) Inventor: Yassin Aden Awad, Cambridge (GB)

(73) Assignee: NEC CORPORATION, Tokyo (JP)

( * ) Notice: Subject to any disclaimer, the term of this patent is extended or adjusted under 35 U.S.C. 154(b) by 14 days.

(21) Appl. No.: 14/787,531

(22) PCT Filed: Apr. 30, 2014

(86) PCT No.: PCT/JP2014/062414
§ 371 (c)(1),
(2) Date: Oct. 28, 2015

(87) PCT Pub. No.: WO2014/181847
PCT Pub. Date: Nov. 13, 2014

(65) Prior Publication Data
US 2016/0073391 A1     Mar. 10, 2016

(30) Foreign Application Priority Data

May 10, 2013   (GB) .................................. 1308424.9

(51) Int. Cl.
*H04W 72/04* (2009.01)
*H04L 1/18* (2006.01)
(Continued)

(52) U.S. Cl.
CPC ....... *H04W 72/0406* (2013.01); *H04L 1/0003* (2013.01); *H04L 1/1822* (2013.01); *H04L 1/1864* (2013.01); *H04L 5/0055* (2013.01)

(58) Field of Classification Search
None
See application file for complete search history.

(56) References Cited

U.S. PATENT DOCUMENTS

2009/0129259 A1*  5/2009  Malladi ................ H04B 7/0417
                                                                    370/210
2009/0279460 A1*  11/2009  Sarkar ...................... H04L 1/16
                                                                    370/280

(Continued)

FOREIGN PATENT DOCUMENTS

JP    2011-518464 A    6/2011
JP    2011-525731 A    9/2011
(Continued)

OTHER PUBLICATIONS

Intel Corporation, "PUCCHI Transmission in Small Cell Environment" 3GPP TSG, Draft: R1-130918. Apr. 15-19, 2013. Cited in ISR.

(Continued)

*Primary Examiner* — Eunsook Choi (57) ABSTRACT

A communication system is provided in which a communication node can allocate resources, for another communication node, within a number of consecutive subframes using a single control message. The other communication node receives codewords transmitted over using the allocated resources, aggregates ACK/NACK feedback for the received codewords and transmits the aggregated ACK/NACK feedback to the communication node for use in controlling subsequent transmission of new codewords or retransmission of previous codewords.

23 Claims, 6 Drawing Sheets

(51) Int. Cl.
*H04L 1/00* (2006.01)
*H04L 5/00* (2006.01)

(56) References Cited

U.S. PATENT DOCUMENTS

| | | |
|---|---|---|
| 2010/0195587 A1 | 8/2010 | Ratasuk et al. |
| 2012/0099491 A1 | 4/2012 | Lee et al. |
| 2012/0127938 A1 | 5/2012 | Lv et al. |
| 2013/0070707 A1 | 3/2013 | Cai et al. |
| 2013/0223318 A1* | 8/2013 | Liu .................. H04W 4/06 370/312 |
| 2014/0086160 A1* | 3/2014 | Kim .................. H04L 1/00 370/329 |
| 2015/0139155 A1 | 5/2015 | Wang et al. |

FOREIGN PATENT DOCUMENTS

| | | |
|---|---|---|
| JP | 2013-042272 A | 2/2013 |
| WO | 2012/111975 A2 | 8/2012 |
| WO | 2012/121574 A2 | 9/2012 |

OTHER PUBLICATIONS

NEC Group, "Multi-subrame and cross-subframe scheduling in small cells", 3GPP TSG, Draft R1-132336. May 20-24, 2013. Cited in ISR.

Zte, "Motivation for WI further small calls enhancements for E-UTRA-Overhead reduction", 3GPP Draft: R1-131674. Dec. 3-6, 2013. Cited in ISR.

Nokia et al, "On control signaling enhancement for Small Cells", 3GPP Draft: R1-131238. Apr. 15-19, 2013. Cited in ISR.

China Telecom, "Discussion on multi-subframe scheduling", 3GPP Draft: R1-131137. Apr. 15-19, 2013. Cited in ISR.

International Search Report for Pot Applicaton No. PCT/JP2014/062414, mailed Sep. 19, 2014. X.

3rd Generation Partnership Project; Technical Specification Group Radio Access Network; Control overhead reduction for small cell, ZTE, 3GPP TSG-RAN1#72bis, R1-131051, Chicago, USA, Apr. 15-19, 2013, pp. 1-3.

Japanese Office Action for JP Application No. 2015-548530 mailed on Dec. 7, 2016 with English Translation.

* cited by examiner

COMMUNICATION SYSTEM

TECHNICAL FIELD

The present invention relates to the communication of data within a mobile (cellular) communication system and to components of the communication system. The invention has particular, although not exclusive relevance to the reporting of HARQ feedback information in a multi-subframe allocation system.

BACKGROUND ART

OFDMA and single carrier FDMA have been selected as the downlink and uplink multiple access schemes for the E-UTRA air interface currently being studied in 3GPP (which is a standard based collaboration looking at the Long Term Evolution (LTE) of mobile telecommunication systems). In the LTE system, a base station (eNB) which communicates with a number of user devices (UEs) allocates the total amount of time/frequency resource (depending on bandwidth) among as many simultaneous users as possible, in order to enable efficient and fast link adaptation and to attain maximum multi-user diversity gain.

The LTE system provides for both real time (RT) services, such as VoIP, and non-real time (NRT) services, such as web browsing. The time/frequency resources that allow UEs to use these services may be allocated dynamically (ie on demand at the time that they are needed) or semi-persistently depending on the service used. For example, for real time services such as VoIP, where the amount of resources needed is known in advance, the UEs can be allocated the resources in advance (semi-persistently allocated), for example at the time of the call setup. For more "bursty" traffic, such as web browsing traffic, the resources would be allocated dynamically based on the amount of data to be transmitted between the UE and the eNB at the time.

For the transmission of downlink dynamically allocated data, a scheduler in the eNB has the flexibility to dynamically send data on a subframe-by-subframe basis, to pick the preferred transmission parameters (e.g. resource allocation, Modulation and Coding Scheme (MCS), Hybrid Acknowledge Repeat Request (HARQ), Power, etc.) to adapt to the changing link conditions between the eNB and the particular UE and to prioritize among users when scheduling on the current subframe.

In the LTE system, the physical downlink control channel (PDCCH) carries the scheduling assignments and other control information. A PDCCH consists of an aggregation of one or more consecutive control channel elements (CCEs), where a CCE occupies a fraction of the eNB's available physical radio resources. The total number of CCEs that are available depends on the system bandwidth of the eNB and the number of OFDM symbols reserved for PDCCH transmission in a given sub-frame.

In LTE Rel-12, 3GPP are considering introducing a new scheduling approach—multi-subframe scheduling; in which the eNB sends a scheduling assignment that persists for several subframes (ie. resources are assigned to a UE for multiple subframes with one scheduling assignment). The eNB may use multi-subframe scheduling for some UEs and traditional single-subframe scheduling for other UEs at the same time.

DISCLOSURE OF THE INVENTION

Problem(s) to be Solved by the Invention

The inventors have realised, however, that such multi-subframe scheduling can cause problems in how the UEs should send HARQ ACK/NACK feedback to the eNB. In the current LTE specification, a UE sends ACK/NACK feedback using a Physical Uplink Control Channel (PUCCH) resource which is determined by the PDCCH CCE used to send the scheduling assignment. However if the UE uses the same PUCCH resource in every subframe of the multi-subframe assignment then the eNB must avoid reusing the corresponding PDCCH CCE in those subframes for single-subframe assignments to other UEs. Otherwise two UEs will try to use the same PUCCH resource in the same subframe to send ACK/NACK feedback.

Means to Solve the Problem

According to one aspect, the present invention provides a communication node arranged to communicate with another communication node using communications resources that are arranged in subframes. The communication node may be a base station and the other communication node may be a user device, such as a cellular telephone. The communication node comprises: a scheduler that is arranged to generate and output a control message for the other communication node which control message allocates communications resources within a plurality of subframes (typically consecutive subframes) over which the communication node will transmit at least one codeword in each subframe for the other communication node; a transceiver that is arranged to transmit the codewords to the other communication node using the allocated communications resources within the plurality of subframes; and an ACK/NACK module for receiving, from the other communication node, ACK/NACK feedback for each codeword indicating acknowledgment of receipt or non-receipt of the codeword, wherein the ACK/NACK module is arranged to receive, during a subframe, aggregated ACK/NACK feedback from the other communication node indicating acknowledgment of receipt or non-receipt of each of a plurality of codewords transmitted by the communication node in different subframes, and is arranged to process the aggregated ACK/NACK feedback to control the scheduler so that any codewords that were not received are scheduled for retransmission to the other communication node.

In one embodiment, the scheduler is configured to use a plurality of HARQ processes to control transmission of data to the other communication node, such that a different HARQ process is used for each subframe within which communications resources are allocated to the other communication node by said control message. In this case, the scheduler may be arranged so that an HARQ process that is used to transmit a codeword to the other communication node is not reused until the ACK/NACK module has received and processed the ACK/NACK feedback for that codeword. Additionally, the scheduler may be arranged: i) to split available HARQ processes into two or more groups, the HARQ processes in each group being different; ii) to generate a first control message that allocates resources within a first plurality of subframes and a second control message that allocates resources within a second plurality of subframes; iii) to use HARQ processes from the first group for communications made using the resources allocated by the first control message; and iv) to use HARQ processes from the second group for communications made using the resources allocated by the second control message.

In one embodiment, the scheduler is arranged to generate said control message such that it includes resource assignment data that assigns, to the other communication node, the same communications resources within each of the plurality of subframes. Preferably also, the scheduler is arranged to generate said control message such that it includes modulation and coding scheme, MCS, data that indicates that the same modulation and coding scheme will be used to modulate and code the codewords that are to be transmitted to the other communication node using the allocated communications resources within each of the plurality of subframes. The control message may also include data, for each codeword to be transmitted, that indicates whether the codeword is a new code word or a retransmission of a previous codeword. The scheduler may also include within the control message data indicating the number of consecutive subframes to which the allocation relates.

According to another aspect, the present invention provides a communication node arranged to communicate with another communication node using communications resources that are arranged in subframes. In this case, the communication node may be a user device and the other communication node may be a base station. The communication node comprises: a communications module that is arranged to receive a control message from the other communication node, which control message allocates communications resources within a plurality of subframes over which the other communication node will transmit at least one codeword in each subframe for the communication node; a transceiver that is arranged to receive the codewords from the other communication node using the allocated communications resources within the plurality of subframes; and an ACK/NACK module for generating ACK/NACK feedback for each codeword indicating acknowledgment of receipt or non-receipt of the codeword, wherein the ACK/NACK module is arranged to generate aggregated ACK/NACK feedback and to send the aggregated ACK/NACK feedback to the other communication node, which aggregated ACK/NACK feedback indicating acknowledgment of receipt or non-receipt of each of a plurality of codewords received by the communication node in different subframes.

In one embodiment, the communications module uses a plurality of HARQ processes to control reception of data received from the other communication node, such that a different HARQ process is used for each subframe within which communications resources are allocated to the communication node by said control message. In this case, the communications module may determine an HARQ process for a codeword using a number of a subframe in which the codeword is received from the other communication node. The communications module may also be arranged: i) to receive a first control message that allocates resources within a first plurality of subframes and a second control message that allocates resources within a second plurality of subframes; iii) to use HARQ processes from a first group of HARQ processes for communications made using the resources allocated by the first control message; and iv) to use HARQ processes from a second group of HARQ processes for communications made using the resources allocated by the second control message, the HARQ processes in the first group being different from the HARQ processes in the second group.

The received control message may assign the same communications resources within each of the plurality of subframes. The control message may also indicate that the same modulation and coding scheme, MCS, will be used to modulate and code the codewords that are to be received from the other communication node using the allocated communications resources within each of the plurality of subframes. The control message may also include data, for each codeword to be received using the allocated communications resources, that indicates whether the codeword is a new code word or a retransmission of a previous codeword. The control message may also include data indicating the number of consecutive subframes to which the allocation relates.

The present invention also provides a method performed by a communication node that communicates with another communication node using communications resources that are arranged in subframes, the method comprising: generating and outputting a control message for the other communication node that allocates communications resources within a plurality of subframes over which the communication node will transmit at least one codeword in each subframe for the other communication node; transmitting the codewords to the other communication node using the allocated communications resources within the plurality of subframes; receiving, from the other communication node, ACK/NACK feedback for each codeword indicating acknowledgment of receipt or non-receipt of the codeword, wherein the receiving ACK/NACK feedback receives, during a subframe, aggregated ACK/NACK feedback from the other communication node indicating acknowledgment of receipt or non-receipt of each of a plurality of codewords transmitted by the communication node in different subframes; processing the aggregated ACK/NACK feedback and causing any codewords that were not correctly received to be retransmitted to the other communication node.

The present invention also provides a method performed by a communication node that communicates with another communication node using communications resources that are arranged in subframes, the method comprising: receiving a control message from the other communication node, which control message allocates communications resources within a plurality of subframes over which the other communication node will transmit at least one codeword in each subframe for the communication node; receiving the codewords from the other communication node using the allocated communications resources within the plurality of subframes; generating ACK/NACK feedback for each codeword indicating acknowledgment of receipt or non-receipt of the codeword, wherein the generating generates aggregated ACK/NACK feedback that indicates acknowledgment of receipt or non-receipt of each of a plurality of codewords received by the communication node in different subframes; and transmitting the ACK/NACK feedback to the other communication node.

According to another aspect, the invention provides a communication node arranged to communicate with another communication node using communications resources that are arranged in subframes, the communication node comprising: a scheduler for allocating communications resources within a plurality of subframes for use in transmitting data to the other communication node; a transmitter for transmitting a control message to the other communication node, the control message indicating the allocated communications resources within the plurality of subframes over which codewords for the other communication node will be transmitted by the communication node; wherein the scheduler is arranged to cause the transmitter to transmit at least one codeword to the other communication node during each of the allocated subframes, using the allocated communications resources within the subframe; an ACK/NACK module for receiving, from the other communication node, ACK/NACK feedback for each codeword indicating acknowledgment of receipt or non-receipt of the codeword; wherein the scheduler is arranged to cause the transmitter to retransmit a codeword to the other communication node in the event that the codeword is not received by the other communications node; wherein the ACK/NACK module is arranged to receive, during a subframe, aggregated ACK/NACK feedback from the other communication node indicating acknowledgment of receipt or non-receipt of each of a plurality of the codewords transmitted by the communication node in different subframes, and is arranged to process the aggregated ACK/NACK feedback and to control the scheduler so that any codewords that were not received are scheduled to be retransmitted to the other communication node.

According to another aspect, the invention provides a communication node arranged to communicate with another communication node using communications resources that are arranged in subframes, the communication node comprising: means for generating and outputting a control message for the other communication node that allocates communications resources within a plurality of subframes over which the communication node will transmit at least one codeword in each subframe for the other communication node; means for transmitting the codewords to the other communication node using the allocated communications resources within the plurality of subframes; and means for receiving, from the other communication node, ACK/NACK feedback for each codeword indicating acknowledgment of receipt or non-receipt of the codeword, wherein the means for receiving is arranged to receive, during a subframe, aggregated ACK/NACK feedback from the other communication node indicating acknowledgment of receipt or non-receipt of each of a plurality of codewords transmitted by the communication node in different subframes, and is arranged to process the aggregated ACK/NACK feedback and to cause any codewords that were not received to be retransmitted to the other communication node.

According to another aspect, the invention provides a communication node arranged to communicate with another communication node using communications resources that are arranged in subframes, the communication node comprising: a scheduler that is arranged to generate and output a control message for the other communication node that allocates communications resources within a plurality of subframes over which the communication node will transmit at least one codeword in each subframe for the other communication node; a transceiver that is arranged to transmit the codewords to the other communication node using the allocated communications resources within the plurality of subframes; and an ACK/NACK module for receiving, from the other communication node, ACK/NACK feedback for each codeword indicating acknowledgment of receipt or non-receipt of the codeword, wherein the ACK/NACK module is arranged to receive, during a subframe, aggregated ACK/NACK feedback from the other communication node indicating acknowledgment of receipt or non-receipt of each of a plurality of codewords transmitted by the communication node in different subframes, and is arranged to process the aggregated ACK/NACK feedback to control the scheduler so that any codewords that were not received are scheduled to be retransmitted to the other communication node.

According to another aspect, the invention provides a communication node arranged to communicate with another communication node using communications resources that are arranged in subframes, the communication node comprising: means for generating and outputting a control message for the other communication node that allocates communications resources within a plurality of subframes over which the communication node will transmit at least one codeword in each subframe for the other communication node; and means for transmitting the codewords to the other communication node using the allocated communications resources within the plurality of subframes; wherein the means for generating the control message is arranged to include resource assignment data that assigns, to the other communication node, the same communications resources within each of said plurality of subframes.

According to another aspect, the invention provides a communication node arranged to communicate with another communication node using communications resources that are arranged in subframes, the communication node comprising: means for generating and outputting a control message for the other communication node that allocates communications resources within a plurality of subframes over which the communication node will transmit at least one codeword in each subframe for the other communication node; and means for transmitting the codewords to the other communication node using the allocated communications resources within the plurality of subframes; wherein the means for generating the control message is arranged to include modulation and coding scheme, MCS, data that indicates that the same modulation and coding scheme will be used to modulate and code the codewords that are to be transmitted to the other communication node using the allocated communications resources within each of the plurality of subframes.

According to another aspect, the invention provides a communication node arranged to communicate with another communication node using communications resources that are arranged in subframes, the communication node comprising: means for generating and outputting a control message for the other communication node that allocates communications resources within a plurality of subframes over which the communication node will transmit at least one codeword in each subframe for the other communication node; and means for transmitting the codewords to the other communication node using the allocated communications resources within the plurality of subframes; wherein the means for generating the control message is arranged to include data for each codeword to be transmitted using the allocated communications resources that indicates whether the codeword is a new code word or a retransmission of a previous codeword.

According to another aspect, the invention provides a communication node arranged to communicate with another communication node using communications resources that are arranged in subframes, the communication node comprising: means for generating and outputting a control message for the other communication node that allocates communications resources within a plurality of subframes over which the communication node will transmit at least one codeword in each subframe for the other communication node; and means for transmitting the codewords to the other communication node using the allocated communications resources within the plurality of subframes; wherein the means for generating the control message is arranged to include data indicating the number of consecutive subframes to which the allocation relates.

According to another aspect, the invention provides a communication node arranged to communicate with another communication node using communications resources that are arranged in subframes, the communication node comprising: means for receiveing a control message from the other communication node that allocates communications resources within a plurality of subframes over which the other communication node will transmit at least one codeword in each subframe to the communication node; and means for receiving the codewords from the other communication node using the allocated communications resources within the plurality of subframes; wherein the received control message includes resource assignment data that assigns, to the other communication node, the same communications resources within each of said plurality of subframes.

According to another aspect, the invention provides a communication node arranged to communicate with another communication node using communications resources that are arranged in subframes, the communication node comprising: means for receiveing a control message from the other communication node that allocates communications resources within a plurality of subframes over which the other communication node will transmit at least one codeword in each subframe to the communication node; and means for receiving the codewords from the other communication node using the allocated communications resources within the plurality of subframes; wherein the received control message includes modulation and coding scheme, MCS, data that indicates that the same modulation and coding scheme will be used to modulate and code the codewords that will be received by the communication node using the allocated communications resources within each of the plurality of subframes.

According to another aspect, the invention provides a communication node arranged to communicate with another communication node using communications resources that are arranged in subframes, the communication node comprising: means for receiveing a control message from the other communication node that allocates communications resources within a plurality of subframes over which the other communication node will transmit at least one codeword in each subframe to the communication node; and means for receiving the codewords from the other communication node using the allocated communications resources within the plurality of subframes; wherein the received control message includes data for each codeword to be received that indicates whether the codeword is a new code word or a retransmission of a previous codeword.

According to another aspect, the invention provides a communication node arranged to communicate with another communication node using communications resources that are arranged in subframes, the communication node comprising: means for receiveing a control message from the other communication node that allocates communications resources within a plurality of subframes over which the other communication node will transmit at least one codeword in each subframe to the communication node; and means for receiving the codewords from the other communication node using the allocated communications resources within the plurality of subframes; wherein the means the received control message includes data indicating the number of consecutive subframes to which the allocation relates.

According to another aspect, the invention provides a communication node arranged to communicate with another communication node using communications resources that are arranged in subframes, the communication node comprising: means for receiveing a control message from the other communication node that allocates communications resources within a plurality of subframes over which the other communication node will transmit at least one codeword in each subframe to the communication node; and means for receiving the codewords from the other communication node using the allocated communications resources within the plurality of subframes; wherein the communication node is arranged to determine an HARQ process for a codeword using a number of a subframe in which the codeword is received from the other communication node.

According to another aspect, the invention provides a computer program product comprising computer implementable instructions for causing a programmable communications device to become configured as any of the communication nodes discussed above.

The invention provides, for all methods disclosed, corresponding computer programs or computer program products for execution on corresponding equipment, the equipment itself (user equipment, nodes or components thereof) and methods of updating the equipment.

BRIEF DESCRIPTION OF DRAWINGS

These and various other aspects of the invention will become apparent, from the following detailed description of embodiments which are given by way of example only and which are described with reference to the accompanying Figures in which.

MODE(S) FOR CARRYING OUT THE INVENTION

Embodiments

Figure 1:
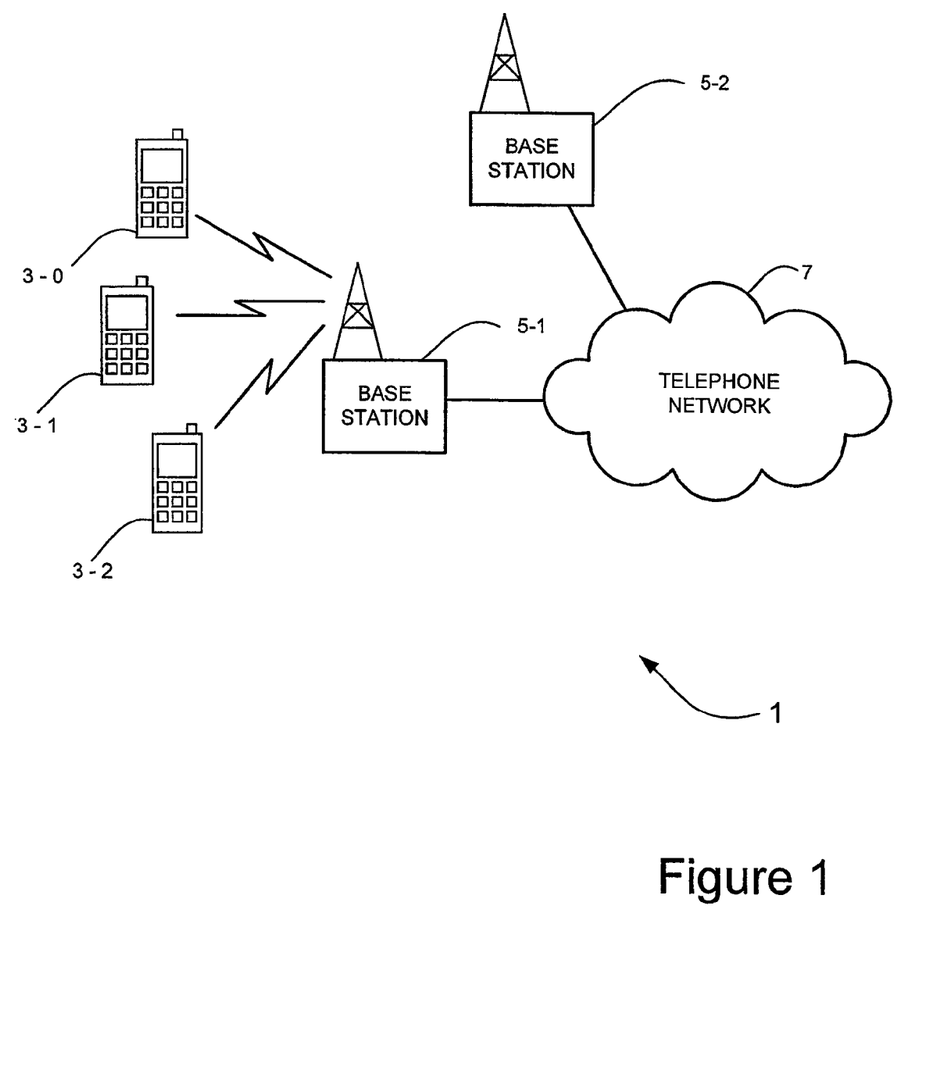
FIG. 1 schematically illustrates a communication system comprising a number of user mobile (cellular) telephones which communicate with a base station connected to the telephone network.

FIG. 1 schematically illustrates a mobile (cellular) telecommunication system 1 in which users of mobile telephones 3-0, 3-1, and 3-2 can communicate with other users (not shown) via a base station 5 and a telephone network 7. In this embodiment, the base station 5 uses an orthogonal frequency division multiple access (OFDMA) technique in which the data to be transmitted to the mobile telephones 3 is modulated onto a plurality of sub-carriers. Different sub-carriers (resources) are allocated by the base station 5 to each mobile telephone 3 depending on the amount of data to be sent to the mobile telephone 3.

LTE Sub-frame Data Structure

Before discussing the specific ways in which the base station 5 can schedule resources to the mobile telephones 3, a brief description will be given of the access scheme and a general frame structure agreed for LTE communications. An Orthogonal Frequency Division Multiple Access (OFDMA) technique is used for the downlink to allow the mobile telephone 3 to receive data over the air interface with the base station 5. Different sub-carriers are allocated by the base station 5 (for a predetermined amount of time) to the mobile telephone 3 depending on the amount of data to be sent to the mobile telephone 3. These are referred to as physical resource blocks (PRBs) in the LTE specifications. PRBs thus have a time and frequency dimension. To do this, the base station 5 allocates PRBs for each device that it is serving and signals the allocations (in a scheduling assignment message) to each of the scheduled devices, in a control channel.

Figure 2A:
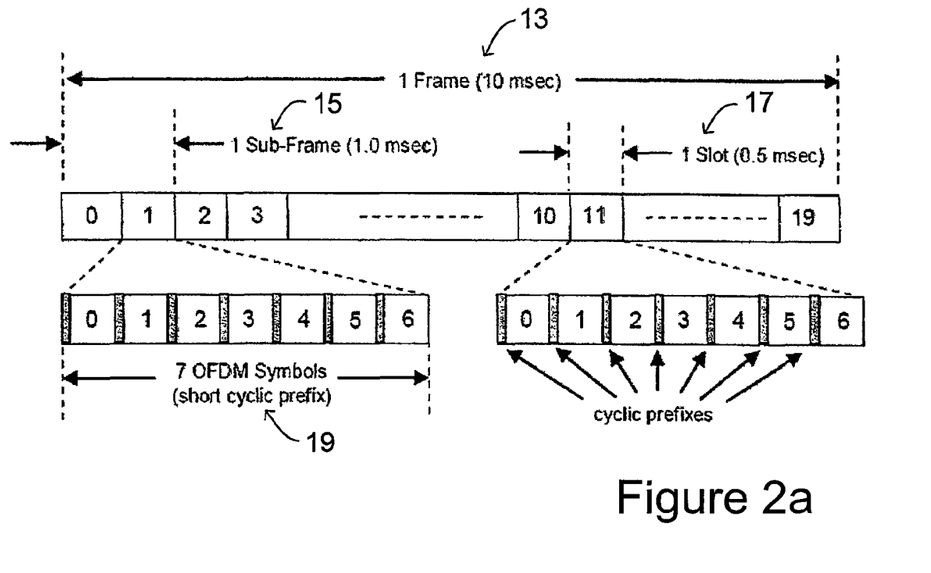
FIG. 2a illustrates a generic frame structure defined for use in the LTE communication network.
Figure 2B:
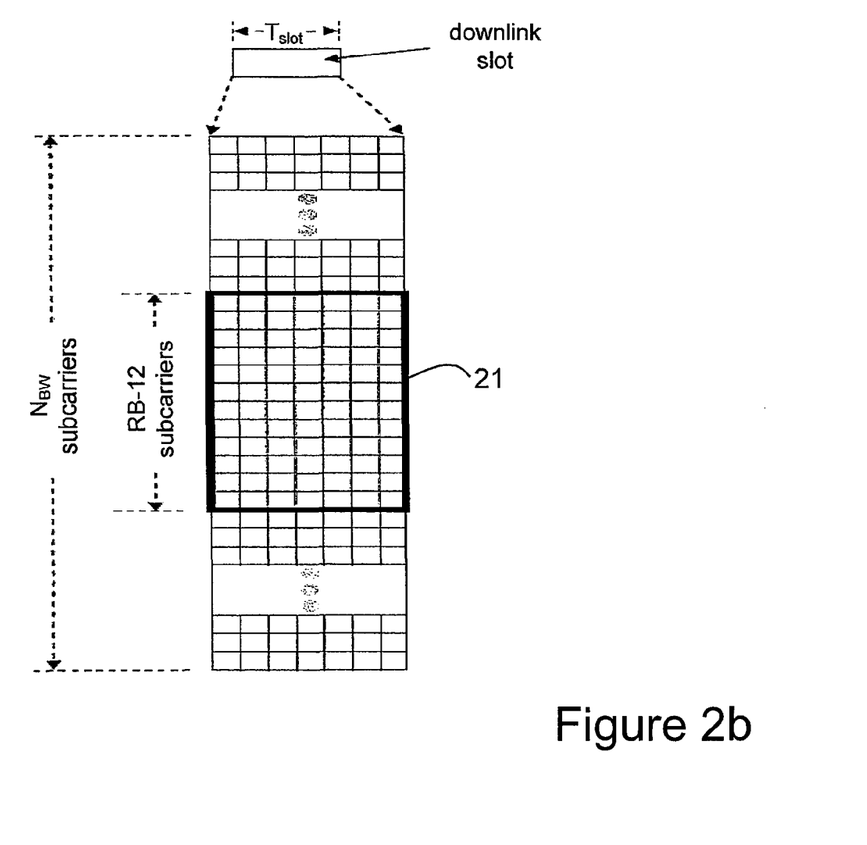
FIG. 2b illustrates the way in which a slot illustrated in FIG. 2a is formed of a number of time-frequency resources.

FIG. 2a illustrates one generic frame structure agreed for LTE communications over the air interface with the base station 5. As shown, one frame 13 is 10 msec long and comprises ten sub-frames 15 of 1 msec duration (known as a Transmission Time Interval (TTI)). Each sub-frame or TTI comprises two slots 17 of 0.5 msec duration. Each slot 17 comprises either six or seven OFDM symbols 19, depending on whether the normal or extended cyclic prefix (CP) is employed. The total number of available sub-carriers depends on the overall transmission bandwidth of the system. The LTE specifications define parameters for system bandwidths from 1.4 MHz to 20 MHz and one PRB is currently defined to comprise 12 consecutive subcarriers for one slot 17 (although this could clearly be different). Carrier aggregation techniques can extend the available bandwidth further, for example up to 100 MHz bandwidths. The transmitted downlink signal comprises $N_{BW}$ subcarriers for a duration of $N_{symb}$ OFDM symbols. It can be represented by a resource grid as illustrated in FIG. 2b. Each box in the grid represents a single sub-carrier for one symbol period and is referred to as a resource element. As shown, each PRB 21 is formed from twelve consecutive sub-carriers and (in this case) seven symbols for each subcarrier; although in practice the same allocations are made in the second slot 17 of each sub-frame 15 as well.

Scheduling Assignments

In this embodiment, the base station 5 can allocate (schedule) resources to a particular mobile telephone 3 in the following three ways:

1) Dynamic resource allocation—on a sub-frame by sub-frame basis;
2) Semi-persistent resource allocation—resources are intermittently allocated in a defined manner; and
3) Multi-subframe resource allocation—resources in plural consecutive sub-frames are allocated.

The base station 5 has the flexibility to use these resource allocation (scheduling) techniques to achieve an efficient transmission over the air interface between the base station 5 and each of the mobile telephones 3 it is serving. Thus for example, for a mobile telephone 3 that is stationary or moving slowly, the base station may determine that it is more efficient to use scheduling assignments that allocate the resources over multiple consecutive subframes to reduce the signalling overhead between the base station 5 and that mobile telephone 3 (as the channel conditions between a stationary or slowly moving mobile telephone 3 and the base station 5 will remain approximately the same at least during a number of consecutive subframes). It is currently proposed that a maximum of eight consecutive subframes can be allocated with a single scheduling assignment, although this may of course change in the future. For other mobile telephones 3 that are perhaps moving relatively quickly, the base station 5 may determine that scheduling assignments should be made using the dynamic resource allocation procedure to maximise the ability of the base station 5 to compensate for changing channel conditions between the base station and the mobile telephone 3.

HARQ for Multi-Subframe Signalling

The LTE communication system uses HARQ techniques to request retransmission of user data when it is not correctly received. Forward Error Correction (FEC) techniques can be used to increase the ability of the mobile telephone to correct for transmission errors. In response to receiving a data message (referred to herein as a codeword), the mobile telephone 3 sends the base station 5, an acknowledgement message (ACK) when the codeword is correctly received or a non-acknowledgement message (NACK) when the codeword is not correctly received. In the case of a NACK, the base station 5 resends the codeword, perhaps using a different FEC encoding. If the retransmitted codeword is also not received without error, then the mobile telephone 3 can combine the two error containing codewords to try to correct the errors and successfully receive the correct codeword. In order to avoid significant delays in the data transmission process, a limit is placed on the number of times that the codeword can be retransmitted by the base station 5 (typically 4 times). Each retransmission may use a different FEC technique and a Redundancy Version (RV) value is normally signalled to the mobile telephone 3 so that it knows how to use the FEC data to correct errors in the codeword and how it should combine the data with the data from previous transmission attempts.

In order that transmission delays are not introduced due to such retransmissions, the base station 5 sends the mobile telephone 3 its data over a number of "HARQ processes". These are effectively parallel streams of data (generated by splitting up original user data to be transmitted to the mobile telephone 3), so that if a retransmission is required on one HARQ process, transmissions of new data can still be made on the other HARQ processes. Each HARQ process is associated with a transmitted codeword until the mobile telephone 3 sends an acknowledgement that the codeword has been received correctly. The current LTE standards define a maximum of eight HARQ processes per mobile telephone 3. The mobile telephone 3 is arranged to combine the codewords from the different HARQ processes back into the original user data. To do this, the mobile telephone 3 needs to know the HARQ process to which each received codeword relates. When resources are scheduled to a mobile telephone 3 using dynamic resource allocation (i.e. allocation based on a subframe by subframe basis), the DCI control data normally indicates the HARQ process to which the codeword that will be transmitted in that subframe relates.

As discussed in the introduction, the inventors have realised that multi-subframe scheduling can cause problems with the currently defined HARQ ACK/NACK feedback process. In particular, if a mobile telephone 3 that has been allocated resources in multiple consecutive subframes, uses the same PUCCH resource in the corresponding subframes used to transmit the ACK/NACK feedback, then the base station 5 must avoid reusing the same PDCCH CCE used to signal the multi-subframe allocation for single-subframe assignments to other mobile telephones 3. Otherwise two mobile telephones 3 will try to use the same PUCCH resource in the same subframe to send their ACK/NACK feedback messages.

In order to reduce this problem, in this embodiment, when a mobile telephone 3 is assigned resources using a multi-subframe scheduling assignment, it is configured to collate the HARQ ACK/NACK feedback data generated during the multiple subframes to which the assignment relates and to send aggregated ACK/NACK feedback to the base station 5 (preferably in one subframe) after the scheduled subframes have been received. Provided the ACK/NACK feedback bits are aggregated in a predefined way, the base station 5 will know how to process the aggregated ACK/NACK feedback data to recover the ACK/NACK feedback for each transmitted codeword (and hence for each HARQ process). For example, the individual ACK/NACK feedback data may be aggregated in the order of the subframes to which they relate.

Additionally, to avoid introducing long intervals between consecutive multi-subframe allocations, the inventors propose to use at least two groups of HARQ processes for adjacent multi-subframe assignments, with the HARQ processes in each group being different. As long as the aggregated ACK/NACK feedback information can be received and processed by the base station 5 before the same HARQ processes are scheduled again, the base station 5 can ensure that codewords are retransmitted when necessary.

According to the current LTE standards, a mobile telephone 3 should transmit ACK/NACK feedback four subframes after receiving the corresponding codeword in the Physical Downlink Shared Channel (PDSCH) transmission. In this way the base station can work out to which codeword the ACK/NACK relates. In addition, at least two subframes are required at the base station 5 to process the ACK/NACK feedback and schedule the transmission of a new codeword or the retransmission of the previous codeword data. Therefore, in this case, there must be at least six subframes between the last PDSCH transmission of a multi-subframe allocation and the first PDSCH transmission of a new multi-subframe allocation that uses the same HARQ processes. This implies that (at least for the current reporting requirements for HARQ) at least twelve HARQ processes are needed—six in each of two groups.

The current proposal for multi-subframe assignments is that resources in up to eight consecutive subframes may be allocated with a single scheduling assignment message. The minimum number of HARQ processes needed to accommodate multi-subframe assignments of eight subframes is sixteen HARQ processes. If three or more groups of HARQ processes are to be used when multi-subframe assignment of eight subframes is performed, then three or more multiples of eight HARQ processes are required.

Figure 3A:
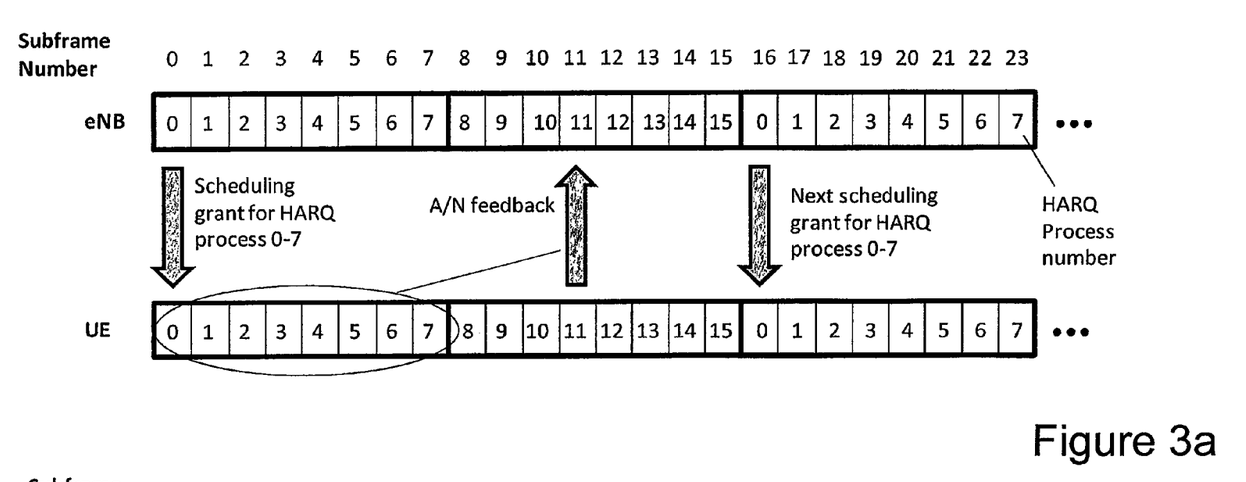
FIG. 3a schematically illustrates one way in which ACK/NACK feedback generated during a multi-subframe assignment is collated and reported in a single subframe after the assignment and illustrates one way in which sixteen different HARQ processes are divided into two groups to allow continuous allocation to a mobile telephone.

FIG. 3*a* illustrates the use of sixteen HARQ processes when multi-subframe assignments of eight subframes is performed, ie. each scheduling assignment sent by the base station 5 contains an allocation for eight successive subframes using eight different HARQ processes. In subframe 0, the base station 5 sends a scheduling assignment to the mobile telephone 3 for HARQ processes 0 to 7. During subframes 0 to 7 the mobile telephone 3 collects ACK/NACK feedback for codewords associated with HARQ processes 0 to 7. In subframe 11 (four subframes after the end of the last transmission of the multi-subframe assignment) the mobile telephone 3 sends the aggregated ACK/NACK feedback associated with HARQ processes 0 to 7 to the base station 5. As discussed above, the aggregated ACK/NACK feedback may order the individual ACK/NACK feedback for HARQ processes such that the ACK/NACK feedback associated with HARQ process 0 comes before the ACK/NACK feedback associated with HARQ process 1, which comes before the ACK/NACK feedback associated with HARQ process 2 etc. In subframes 12 to 15 the base station 5 processes the ACK/NACK feedback and makes scheduling decisions. In subframe 16, the base station 5 sends a new scheduling assignment to the mobile telephone 3 for HARQ processes 0 to 7; and the process is repeated.

An identical process operates in parallel for HARQ processes 8 to 15. Although not illustrated in FIG. 3*a*, for HARQ processes 8 to 15 the base station 5 sends a scheduling assignment message in subframe 8 and the mobile telephone 3 sends the aggregated ACK/NACK feedback in subframe 19.

By collecting the ACK/NACK feedback for all eight subframes and transmitting it all in one subframe the mobile telephone 3 uses PUCCH resources in only one subframe. This makes it easier to avoid PUCCH resource clashes with other mobile telephones 3 (i.e. the restrictions on PDCCH CCE reuse are relaxed).

Figure 3B:
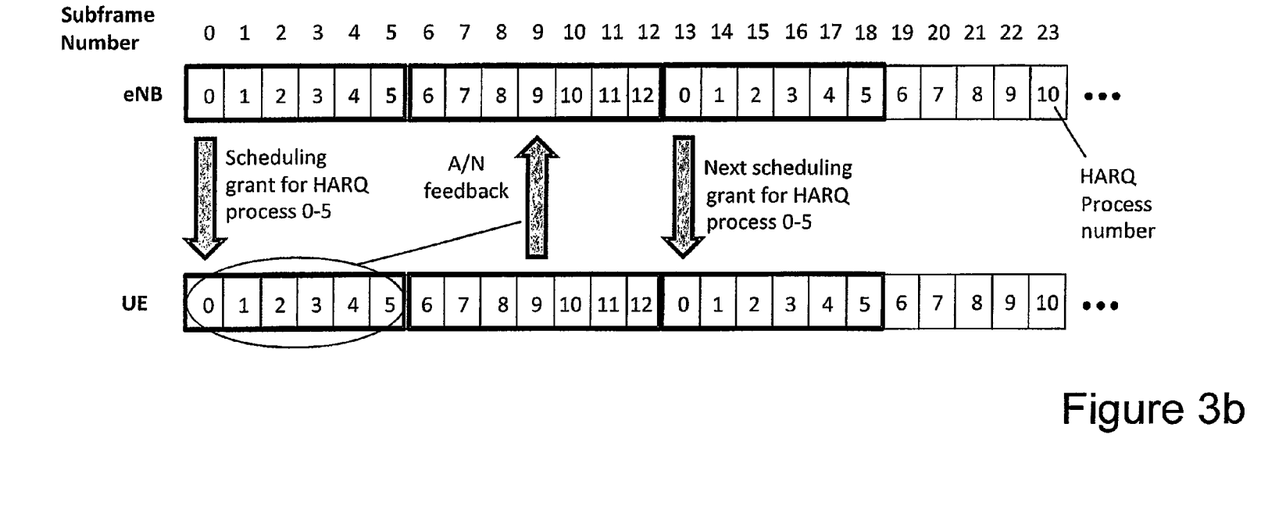
FIG. 3b schematically illustrates another way in which ACK/NACK feedback generated during a multi-subframe assignment is collated and reported in a single subframe after the assignment and illustrates a way in which thirteen different HARQ processes are divided into two groups to allow continuous allocation to a mobile telephone.

FIG. 3*b* illustrates the use of thirteen HARQ processes when multi-subframe assignments of six and seven subframes is performed in adjacent assignments, ie. the first scheduling assignment sent by the base station 5 contains an allocation for six successive subframes using six different HARQ processes; and the second scheduling assignment sent by the base station 5 contains an allocation for seven successive subframes using seven different HARQ processes (that are also different from the HARQ processes used in the first assignment).

In this example, in subframe 0, the base station 5 sends a scheduling assignment to the mobile telephone 3 for HARQ processes 0 to 5. During subframes 0 to 5 the mobile telephone 3 collects ACK/NACK feedback for received codewords associated with HARQ processes 0 to 5. In subframe 9 (four subframes after the end of the last transmission of the multi-subframe assignment) the mobile telephone 3 sends the aggregated ACK/NACK feedback associated with all of HARQ processes 0 to 5 to the base station 5. In subframes 10 to 12 the base station 5 processes the ACK/NACK feedback and makes scheduling decisions. In subframe 13, the base station 5 sends a new scheduling assignment to the mobile telephone 3 for HARQ processes 0 to 5; and the process is repeated.

An identical process operates in parallel for HARQ processes 6 to 12. Although not illustrated in FIG. 3*b*, for HARQ processes 6 to 12 the base station 5 sends a scheduling assignment message in subframe 6 and the mobile telephone 3 sends the aggregated ACK/NACK feedback in subframe 16.

Figure 3C:
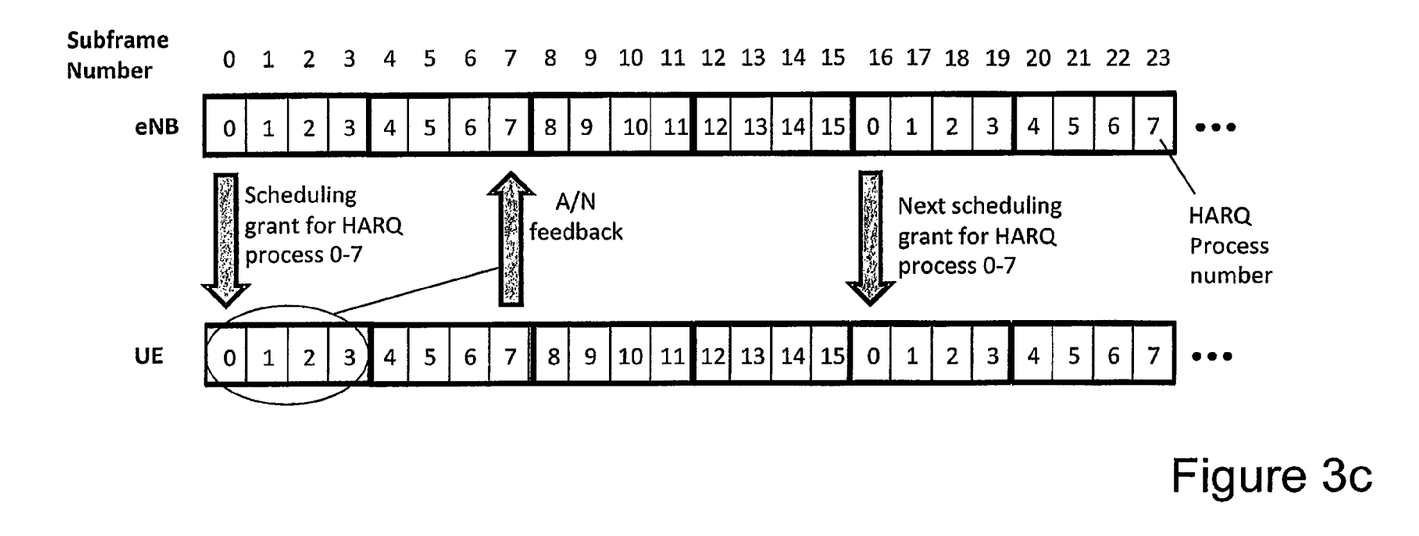
FIG. 3c schematically illustrates another way in which ACK/NACK feedback generated during a multi-subframe assignment is collated and reported in a single subframe after the assignment and illustrates a way in which sixteen different HARQ processes are divided into four groups to allow continuous allocation to a mobile telephone.

In the examples illustrated in FIGS. 3*a* and 3*b*, the HARQ processes have been divided into two groups. However, as mentioned above, the HARQ processes may be divided into more than two groups, depending on the number of HARQ processes available and the number of consecutive subframes that are allocated in a multi-subframe allocation. For example, FIG. 3*c* illustrates an example where there are sixteen HARQ processes and each multi-subfame allocation sent by the base station 5 contains an allocation for four successive subframes using four different HARQ processes.

In general, if there are R subframes for the basic ACK/NACK reporting delay and P subframes for processing the ACK/NACK feedback at the base station 5, then for assignments of N subframes the number of HARQ processes needed is N*ceil((N+R+P)/N), eg. assuming R=4 and P=3 then:

| N | NumberOfHARQProcesses |
|---|---|
| 2 | 10 |
| 3 | 12 |
| 4 | 12 |
| 6 | 18 |
| 8 | 16 |

DCI Format

Another aspect of multi-subframe scheduling is the format of the control data that carries the multi-subframe scheduling assignment. A new Downlink Control Indicator (DCI) format is needed for multi-subframe scheduling grants because it needs to signal information about multiple HARQ processes.

The inventors propose that the modulation and coding scheme (MCS) and resource block assignment are the same for all HARQ processes within a multi-subframe assignment, so that it is not necessary to signal this information for each HARQ process.

The inventors also propose that the HARQ process number associated with a codeword is determined from, for example, the subframe number in which the codeword is transmitted. This may be determined, for example, according to a fixed mapping (such as an equation) known by the base station 5 and the mobile telephone 3. In this way, it is not necessary for the base station 5 to signal the HARQ process number in the DCI control data allocating the resources. For example, the equation may be a simple modulo operation:

$$N_{sf} \bmod N$$

where $N_{sf}$ is the subframe number and N is the number of available HARQ processes. Thus, the base station 5 and the mobile telephone 3 can determine to which HARQ process each transmitted codeword relates using the subframe number and the known mapping. The mobile telephone 3 can then combine the codewords to recover the user data.

The inventors propose that in the case of HARQ retransmission, the redundancy version (RV) follows a fixed predetermined sequence (as is currently the case in the uplink), so that it is not necessary to signal the RV for each HARQ process. For example, the first retransmission always uses RV0, the second retransmission always uses RV1 etc. Therefore, provided the mobile telephone 3 keeps track of how many retransmissions of the codeword there have been, it can work out how to try to decode the received data for the current transmission attempt and/or how to combine it with the data received from previous transmission attempts.

The inventors propose to include a field that defines the number of consecutive subframes to which the multi-subframe assignment relates. This field is only needed in the case that the multi-subframe assignment can relate to a variable number of consecutive subframes. Where each multi-subframe assignment relates to a fixed number of subframes, this field can be omitted if desired.

The inventors also propose to add a "new data indicator" (NDI) for each HARQ process to indicate if the transmission is a new transmission or a retransmission. So for a multi-subframe assignment for eight subframes, the NDI may comprise a bitmap of eight bits, one for each subframe in the assignment, indicating if the data that is being transmitted in that subframe is new data or a retransmission. For example a "1" may indicate new data and a "0" may indicate a retransmission, or vice versa.

The proposed DCI format for multi-subframe scheduling grants therefore includes the following:

One resource block assignment and one MCS, which is common to all HARQ processes. In the case of MIMO (multiple input multiple output—as used when the base station and the mobile telephone employ multiple antennas in their communications) one MCS is signalled for each transmitted codeword);

An optional field that defines the number of consecutive subframes to which the multi-subframe assignment relates;

One NDI bit per transmitted codeword (ie. one bit per HARQ process in the case of single codeword transmission; two bits per HARQ process in the case of MIMO with two codewords). The NDI information can be represented as a bit map or by any other suitable encoded data string.

Base Station

Figure 4:
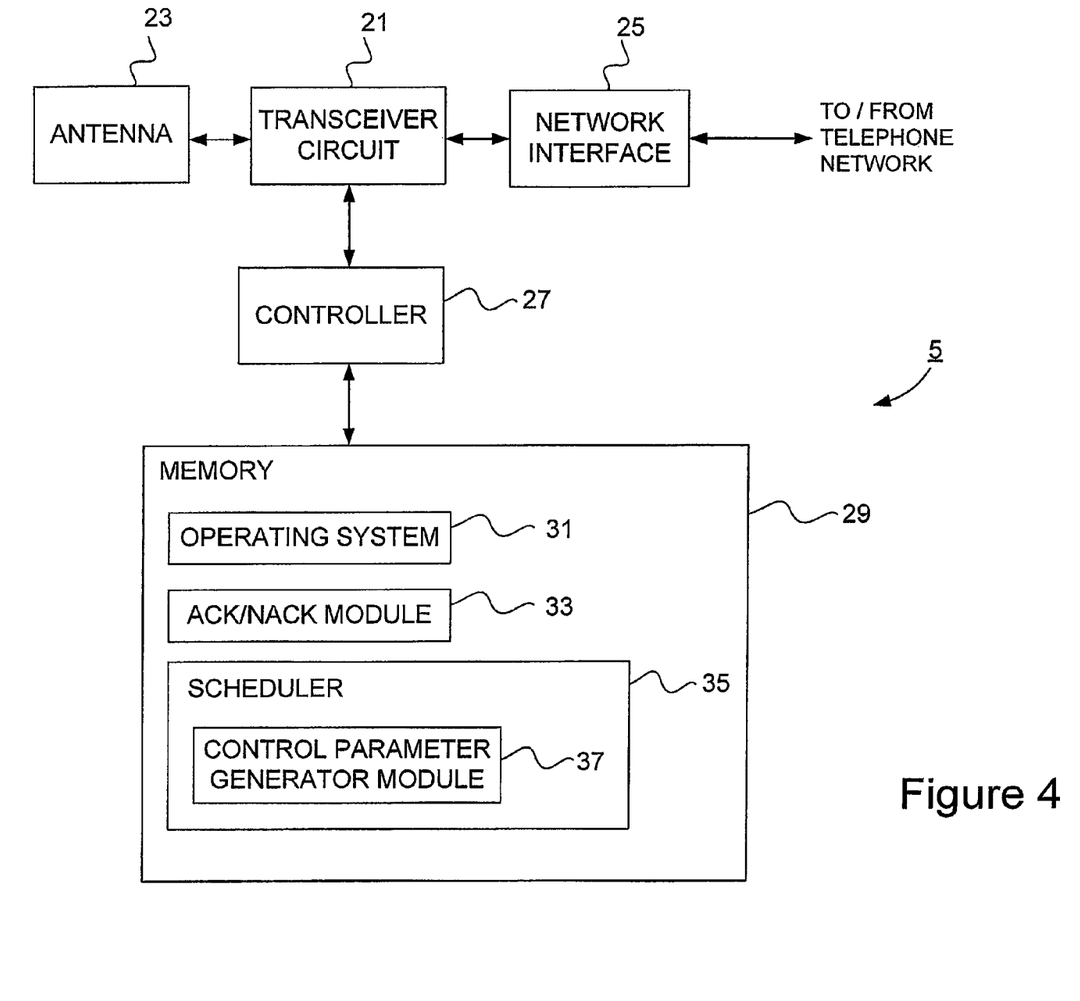
FIG. 4 is a block diagram illustrating the main components of the base station shown in FIG. 1.

FIG. 4 is a block diagram illustrating the main components of the base station 5 used in this embodiment. As shown, the base station 5 includes a transceiver circuit 21 which is operable to transmit signals to and to receive signals from the mobile telephones 3 via one or more antennae 23 (using the above described sub-carriers) and which is operable to transmit signals to and to receive signals from the telephone network 7 via a network interface 25. The operation of the transceiver circuit 21 is controlled by a controller 27 in accordance with software stored in memory 29. The software includes, among other things, an operating system 31 an ACK/NACK module 33 and a scheduler 35. The ACK/NACK module 33 is responsible to receive ACK/NACK feedback (aggregated or otherwise) from the mobile telephones 3 and, in the case of NACKs, to control the scheduler 35 so that the corresponding data can be retransmitted to the mobile telephone 3. The scheduler 35 is responsible for allocating the resources to be used by the transceiver circuit 21 in its communications with the mobile telephones 3. The scheduler 35 decides on whether to allocate the resources (sub-carriers) using the above mentioned techniques of semi-persistent allocation, dynamic resource allocation and multi-subframe resource allocation. The scheduler 35 also schedules the data to be transmitted or retransmitted to each mobile telephone 3 in each subframe. As shown in FIG. 4, the resource allocation module 33 includes control parameter generator module 37 for generating the required DCI control parameters for each mobile telephone 3 that define the resources (PRBs) that are allocated to each mobile telephone 3.

Mobile Telephone

Figure 5:
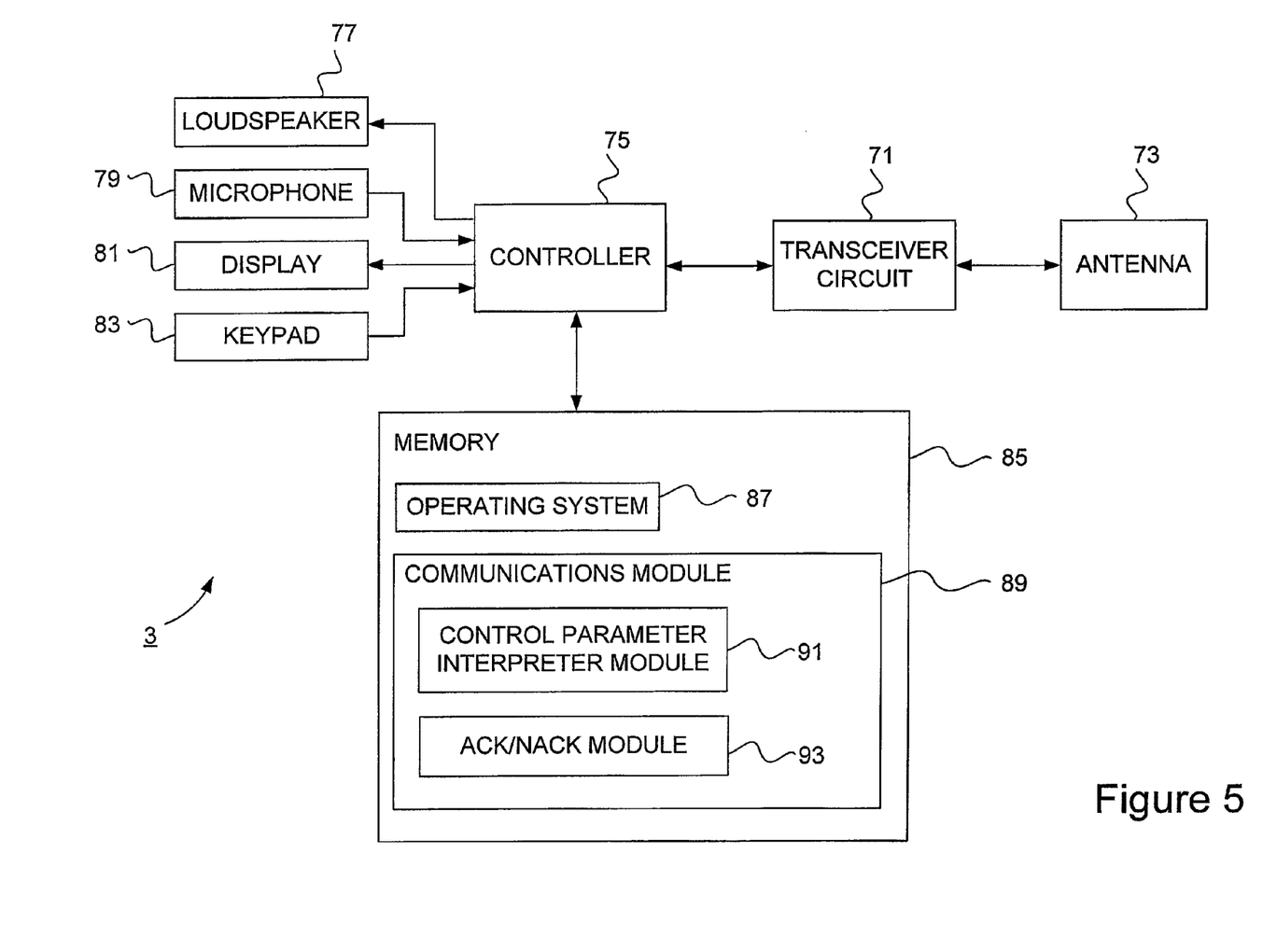
FIG. 5 is a block diagram illustrating the main components of one of the mobile telephones shown in FIG. 1.

FIG. 5 schematically illustrates the main components of each of the mobile telephones 3 shown in FIG. 1. As shown, the mobile telephones 3 include a transceiver circuit 71 which is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87 and a communications module 89. In this embodiment, the communications module 89 includes a control parameter interpreter module 91 for interpreting received DCI control parameters that define a resource allocation—so that the communications module 89 knows on which resources downlink data for the mobile telephone 3 will be received and on which resources the mobile telephone 3 should transmit its uplink data. The communications module 89 also includes an ACK/NACK module 93 that generates ACK/NACK feedback information for received codewords and that controls the timing of when the ACK/NACK feedback is made. For example, in the case of a conventional dynamic allocation of resources in a current subframe—the ACK/NACK module 93 would send an ACK/NACK feedback for the data received in a current sub-frame, four subframes later; or in the case of a multi-subframe assignment, the ACK/NACK feedback module 93 collates the ACK/NACK feedbacks from all the sub-frames of the multi-subframe assignment and sends the aggregated ACK/NACK feedback to the base station 5 in a single subframe (in the manner discussed above).

In the above description, the base station 5 and the mobile telephones 3 are described for ease of understanding as having a number of discrete modules (such as the resource allocation module, control parameter generator module, communications module and control parameter interpreter module). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Modifications and Alternatives

A number of detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above embodiments, a mobile telephone based telecommunication system was described in which the above described signalling techniques were employed. As those skilled in the art will appreciate, the signalling of such resource allocation data can be employed in any communication system that uses a plurality of sub-carriers. In particular, the signalling techniques described above can be used in wire or wireless based communications either using electromagnetic signals or acoustic signals to carry the data. In the general case, the base station would be replaced by a communication node which communicates with a number of different user devices. User devices may include, for example, personal digital assistants, laptop computers, web browsers, etc. Similarly, the invention can also be used in systems where the base station is communicating with other types of communication nodes—such as rely nodes.

In the above embodiment, the aggregated ACK/NACK feedback for all subframes of a multi-subframe allocation was sent in a single sub-frame. Transmitting such aggregated ACK/NACK feedback in a single frame minimises the constraints placed on the base station 5 with regard to the re-use of CCE resources used to send mobile telephones their scheduling grants. As those skilled in the art will appreciate, transmission of such aggregated ACK/NACK feedback in a single subframe is not essential. Provided at least some aggregated ACK/NACK feedback is transmitted, the requirements on the base station are relaxed to some extent. For example, if a multi-subframe assignment allocates resources for eight sub-frames, then normally ACK/NACK feedback would be sent in eight subsequent sub-frames, requiring the base station to avoid using certain CCE resources in those eight sub-frames. In this case improvements are still made if the ACK/NACK feedback is transmitted back to the base station in seven sub-frames—for example where aggregated ACK/NACK feedback for two subframes is transmitted together in one subframe. Thus provided aggregated ACK/NACK feedback for multiple sub-frames is transmitted in at least one subframe, the invention provides an improvement.

In the above embodiments, a number of software modules were described. As those skilled will appreciate, the software modules may be provided in compiled or un-compiled form and may be supplied to the base station or to the mobile telephone as a signal over a computer network, or on a recording medium such as a DVD ROM. Further, the functionality performed by part or all of this software may be performed using one or more dedicated hardware circuits. However, the use of software modules is preferred as it facilitates the updating of the base station 5 and the mobile telephones 3 in order to update their functionalities.

The following is a detailed description of comments and observations surrounding multi-subframe assignments and other topics relating implementation in the currently proposed 3GPP LTE standard. Whilst various features may be described as being essential or necessary, this may only be the case for the proposed 3GPP LTE standard, for example due to other requirements imposed by the standard. These statements should not, therefore, be construed as limiting the present invention in any way.

Introduction

In RAN1#72bis, the control signalling enhancements in small cells have been discussed and it is observed that multi-subframe scheduling and/or cross-subframe scheduling could reduce the control signalling overhead by exploiting the channel that is time-invariant over a number of consecutive subframes. The observation and next steps are restated below:

Observations:
  Multi-subframe scheduling and/or cross-subframe scheduling are proposed by many companies
    Not necessarily limited to small cells, but may be able to exploit relatively time-invariant channels Next Steps:
  For RAN1#73, focus on study of multi-subframe scheduling and cross-subframe scheduling
    Identify characteristics of potential schemes, e.g. for multi-subframe scheduling, how does it differ from SPS, how many subframes, how is link adaptation and HARQ retransmissions handled?
    Evaluate whether there are useful potential gains (in throughput or other gains) from overhead reduction (multi-subframe scheduling) or statistical multiplexing gain (cross-subframe scheduling)
    Consider impact of resulting scheduling restrictions and potential means to mitigate such impact
    Identify potential specification impact
  Also consider PDSCH/EPDCCH starting in first OFDM symbol In this contribution, we discuss the issues relating to multi-subframe scheduling and cross-subframe scheduling such as overhead reduction, scheduling restrictions, HARQ retransmissions and specification impact.

1. Multi-subframe and Cross-subframe Scheduling in Small Cells

The definition of multi-subframe scheduling and cross-subframe scheduling is as follows [1-2]:

In multi-subframe scheduling, one control channel (i.e. DCI format) can schedule PDSCH or PUSCH for the current and multiple future subframes with the same transmission format such as resource allocation, MCS, etc.

In cross-subframe scheduling, an allocation (e.g. PDSCH) is intended to a different subframe than the one where control channel is transmitted which improves the statistical multiplexing gain of the control channels.

The motivation of multi-subframe scheduling is that it can be applied in small cell scenarios in which the channel is time-invariant in a number of future subframes (i.e. UE mobility is low). So, in this case, one control channel can schedule to multiple future subframes, and hence, there seems a non-trivial control signaling overhead reduction. On the other hand, the argument against is that the number of UEs in a small cell is generally small, the number of UEs scheduled in a subframe is also small and the average SINR that the UEs experience is relatively high, hence, resulting using lower aggregation levels for PDCCH/EPDCCH. Therefore, the control channel overhead is already at its low level and any further overhead saving would be small. On the other hand, cross-subframe scheduling does not directly reduce overhead for control signalling, although it might provide statistical multiplexing gain and some scheduling flexibility. However, the benefits of cross-subframe scheduling are not clear at this stage.

Nevertheless, as agreed in RAN1#72bis, the current ongoing evaluations would definitely quantify the overhead saving of the multi-subframe scheduling and cross-subframe scheduling. However, the signalling overhead saving should not be the only decision making parameter; other aspects such as scheduling restrictions, link adaptation, HARQ issues, specification impact, etc. have to be considered as well.

Observation 1: Signaling overhead saving should not be the only decision making parameter; other aspects such as scheduling restrictions, link adaptation, HARQ issues, specification impact, etc. have to be considered as well.

1.1 Scheduling Restriction

In the current LTE system, two scheduling mechanisms are supported: dynamic packet scheduling (DPS) and semi-persistent scheduling (SPS). In this case, the characteristics of the incoming data traffic make the scheduler to choose the type of the scheduling mechanism.

For DL DPS, the scheduler has a flexibility to dynamically send data on subframe-by-subframe basis (i.e. the unit of scheduling is per subframe), to pick the preferred transmission parameters (e.g. resource allocation, MCS, HARQ, Power, etc.) for a proper link adaptation and to prioritize among users when scheduling on the current subframe. However, if multi-subframe scheduling is applied and the incoming data is bursty, the scheduler may lose the flexibility to prioritize among users as well as to modify transmission parameters in every subframe. That means the benefits of link adaptations by both MCS change and allocated PRB resources change might be compromised. Thus, the control channel overhead reduction may not translate into overall system capacity improvements significantly. In addition, as the incoming data is bursty with unknown estimate of time of arrival and size, dis-similar to SPS traffic, the scheduler has to allocate the resources as needed and free otherwise which creates uncertainty and abrupt decisions at the scheduler, hence, multi-subframe scheduling would increase the complexity of the scheduler.

Observation 2: Complexity of ENB scheduler and overall system capacity improvements have to be considered when deciding the benefits of the multi-subframe and cross-subframe scheduling.

1.2 HARQ Retransmissions

For the DL DPS, asynchronous adaptive HARQ with stop-and-wait procedure is followed in which if decoding of the packet fails, the packet is retransmitted based on transmission of downlink control information/parameters. The scheduler has flexibility to dynamically schedule any retransmissions in time-resource as well as frequency-resource.

However, in case of DL multi-subframe scheduling and cross-subframe scheduling, how to handle HARQ retransmissions is unclear such as the followings:

Multi-subframe period in multi-subframe scheduling

Possible distance between the subframe with DL grant and the target subframe in cross-subframe scheduling ACK/NACK feedback method (e.g. timing, concatenation of ACK/NACKs)

Total number of HARQ processes

Downlink control information (e.g. HARQ process number, redundancy version, NDI)

Related with the above discussion points, at least for FDD, one example to handle DL HARQ retransmissions is to employ synchronous non-adaptive HARQ scheme for downlink transmission. Similar to the current LTE uplink, the HARQ process number in each sub-frame is determined from the sub-frame number according to a fixed mapping known by the eNB and the UE, and the redundancy version (RV) follows a fixed predetermined sequence. This will at least reduce some signalling overhead in the downlink control information.

Observation 3: To handle DL HARQ retransmissions, synchronous non-adaptive HARQ scheme may be considered for reducing the signaling overhead purpose.

1.3 Potential Specification Impact

Based on the discussion above, there may be some specification impacts such as the followings:

To define how many future subframes the scheduling spans for multi-subframe scheduling and/or how far future subframe can be scheduled for cross-subframe scheduling, for example 4, 6 or 8 subframes, and corresponding signaling method.

To change the way the HARQ retransmissions is handled in both downlink and uplink subframes.

How to handle the collision between the chosen DL HARQ scheme and MBSFN subframes, system information and the existing signals.

The number of blind decoding should not be increased compared to the maximum number of blind decodings (BDs) that the UE is capable of in previous LTE Release. This needs to be taken into account during the design and specifications.

2 Conclusion

In this contribution, we have discussed issues relating to multi-subframe scheduling and cross-subframe scheduling such as overhead reduction, scheduling restrictions, HARQ retransmissions and specification impact. We have the following observations:

Observation 1: Signaling overhead saving should not be the only decision making parameter; other aspects such as scheduling restrictions, link adaptation, HARQ issues, specification impact, etc. have to be considered as well.

Observation 2: Complexity of eNB scheduler and overall system capacity improvements have to be considered when deciding the benefits of the multi-subframe and cross-subframe scheduling.

Observation 3: To handle DL HARQ retransmissions, synchronous non-adaptive HARQ scheme may be considered for reducing the signaling overhead purpose.

This application is based upon and claims the benefit of priority from United Kingdom patent application No. 1308424.9, filed on May 10, 2013, the disclosure of which is incorporated herein in its entirety by reference.

The invention claimed is:

1. A communication node arranged to communicate with another communication node using communications resources that are arranged in subframes, the communication node comprising:
   a controller configured to generate and output a control message for the other communication node, the control message allocating communications resources within a plurality of subframes over which the communication node will transmit at least one codeword in each subframe for the other communication node; and
   a transceiver configured to transmit the codewords to the other communication node using the allocated communications resources within the plurality of subframes,
   wherein the transceiver is further configured to receive, from the other communication node, ACK/NACK feedback for each codeword indicating acknowledgment of receipt or non-receipt of the codeword,
   wherein the transceiver is further configured to receive, during a subframe, aggregated ACK/NACK feedback from the other communication node indicating acknowledgment of receipt or non-receipt of each of a plurality of codewords transmitted by the communication node in different subframes, and is further configured to process the aggregated ACK/NACK feedback to control the controller so that any codewords that were not received are scheduled for retransmission to the other communication node, and
   wherein the aggregated ACK/NACK feedback comprises an order of subframes concerned with Hybrid Acknowledge Repeat Request (HARQ) processes.

2. A communication node according to claim 1, wherein the controller is further configured to use a plurality of HARQ processes to control transmission of data to the other communication node, such that a different HARQ process is used for each subframe within which communications resources are allocated to the other communication node by said control message.

3. A communication node according to claim 2, wherein the controller is further configured so that a HARQ process that is used to transmit a codeword to the other communication node is not reused until the transceiver has received and processed the ACK/NACK feedback for that codeword.

4. A communication node according to claim 2, wherein the controller is further configured:
   i) to split available HARQ processes into two or more groups, the HARQ processes in each group being different;
   ii) to generate a first control message that allocates resources within a first plurality of subframes and a second control message that allocates resources within a second plurality of subframes;
   iii) to use HARQ processes from the first group for communications made using the resources allocated by the first control message; and
   iv) to use HARQ processes from the second group for communications made using the resources allocated by the second control message.

5. A communication node according to claim 1, wherein the controller is further configured to generate said control message such that it includes resource assignment data that assigns, to the other communication node, the same communications resources within said plurality of subframes.

6. A communication node according to claim 1, wherein the controller is further configured to generate said control message such that it includes Modulation and Coding Scheme (MCS) data that indicates that the same modulation and coding scheme will be used to modulate and code the codewords that are to be transmitted to the other communication node using the allocated communications resources within the plurality of subframes.

7. A communication node according to claim 1, wherein the controller is further configured to include, within the control message for the allocated resources, data for each codeword to be transmitted using the allocated communications resources that indicates whether the codeword is a new code word or a retransmission of a previous codeword.

8. A communication node according to claim 1, wherein the controller is further configured to include within said control message data indicating the number of consecutive subframes to which the allocation relates.

9. A communication node arranged to communicate with another communication node using communications resources that are arranged in subframes, the communication node comprising:
   a transceiver configured to receive a control message from the other communication node, the control message allocating communications resources within a plurality of subframes over which the other communication node will transmit at least one codeword in each subframe for the communication node;
   wherein the transceiver is further configured to receive the codewords from the other communication node using the allocated communications resources within the plurality of subframes; and
   a controller configured to generate ACK/NACK feedback for each codeword indicating acknowledgment of receipt or non-receipt of the codeword, and
   wherein the controller is further configured to generate aggregated ACK/NACK feedback and to send the aggregated ACK/NACK feedback to the other communication node, the aggregated ACK/NACK feedback indicating acknowledgment of receipt or non-receipt of each of a plurality of codewords received by the communication node in different subframes, and
   wherein the aggregated ACK/NACK feedback comprises an order of subframes concerned with Hybrid Acknowledge Repeat Request (HARQ) processes.

10. A communication node according to claim 9, wherein the transceiver is further configured to use a plurality of HARQ processes to control reception of data received from the other communication node, such that a different HARQ process is used for each subframe within which communications resources are allocated to the communication node by said control message.

11. A communication node according to claim 10, wherein the transceiver is further configured to determine a HARQ process for a codeword using a number of a subframe in which the codeword is received from the other communication node.

12. A communication node according to claim 10, wherein the transceiver is further configured:

i) to receive a first control message that allocates resources within a first plurality of subframes and a second control message that allocates resources within a second plurality of subframes;
ii) to use HARQ processes from a first group of HARQ processes for communications made using the resources allocated by the first control message; and
iii) to use HARQ processes from a second group of HARQ processes for communications made using the resources allocated by the second control message, the HARQ processes in the first group being different from the HARQ processes in the second group.

13. A communication node according to claim 9, wherein the received control message assigns the same communications resources within said plurality of subframes.

14. A communication node according to claim 9, wherein the control message includes Modulation and Coding Scheme (MCS) data that indicates that the same modulation and coding scheme will be used to modulate and code the codewords that are to be received from the other communication node using the allocated communications resources within the plurality of subframes.

15. A communication node according to claim 9, wherein the control message includes data, for each codeword to be received using the allocated communications resources, that indicates whether the codeword is a new code word or a retransmission of a previous codeword.

16. A communication node according to claim 9, wherein the control message includes data indicating the number of consecutive subframes to which the allocation relates.

17. A communication node according to claim 1, wherein the communication node is a base station of a communication system.

18. A communication node according to claim 9, wherein the communication node is a mobile user device.

19. A method performed by a communication node that communicates with another communication node using communications resources that are arranged in subframes, the method comprising:
generating and outputting a control message for the other communication node that allocates communications resources within a plurality of subframes over which the communication node will transmit at least one codeword in each subframe for the other communication node;
transmitting the codewords to the other communication node using the allocated communications resources within the plurality of subframes;
receiving, from the other communication node, ACK/NACK feedback for each codeword indicating acknowledgment of receipt or non-receipt of the codeword, wherein the receiving ACK/NACK feedback receives, during a subframe, aggregated ACK/NACK feedback from the other communication node indicating acknowledgment of receipt or non-receipt of each of a plurality of codewords transmitted by the communication node in different subframes;
processing the aggregated ACK/NACK feedback and causing any codewords that were not correctly received to be retransmitted to the other communication node, wherein the aggregated ACK/NACK feedback comprises an order of subframes concerned with Hybrid Acknowledge Repeat Request (HARQ) processes.

20. A method performed by a communication node that communicates with another communication node using communications resources that are arranged in subframes, the method comprising:
receiving a control message from the other communication node, the control message allocating communications resources within a plurality of subframes over which the other communication node will transmit at least one codeword in each subframe for the communication node;
receiving the codewords from the other communication node using the allocated communications resources within the plurality of subframes; and
generating ACK/NACK feedback for each codeword indicating acknowledgment of receipt or non-receipt of the codeword, wherein the generating generates aggregated ACK/NACK feedback that indicates acknowledgment of receipt or non-receipt of each of a plurality of codewords received by the communication node in different subframes; and
transmitting the ACK/NACK feedback to the other communication node,
wherein the aggregated ACK/NACK feedback comprises an order of subframes concerned with Hybrid Acknowledge Repeat Request (HARQ) processes.

21. A first communication node arranged to communicate with a second communication node using communications resources that are arranged in subframes, the first communication node comprising:
a controller configured to allocate communications resources within a plurality of subframes for use in transmitting data to the second communication node;
a transceiver configured to transmit a control message to the second communication node, the control message indicating the allocated communications resources within the plurality of subframes over which codewords for the second communication node will be transmitted by the first communication node;
wherein the controller is further configured to cause the transmitter to transmit at least one codeword to the second communication node during each of the allocated subframes, using the allocated communications resources within the subframe;
wherein the transceiver is further configured to receive, from the second communication node, ACK/NACK feedback for each codeword indicating acknowledgment of receipt or non-receipt of the codeword;
wherein the controller is further configured to cause the transmitter to retransmit a codeword to the second communication node in the event that the codeword is not received by the second communications node; and
wherein the transceiver is further configured to receive, during a subframe, aggregated ACK/NACK feedback from the second communication node indicating acknowledgment of receipt or non-receipt of each of a plurality of the codewords transmitted by the first communication node in different subframes, and process the aggregated ACK/NACK feedback and to control the controller so that any codewords that were not received are scheduled to be retransmitted to the second communication node, and
wherein the aggregated ACK/NACK feedback comprises an order of subframes concerned with Hybrid Acknowledge Repeat Request (HARQ) processes.

22. A communication node arranged to communicate with another communication node using communications resources that are arranged in subframes, the communication node comprising:
a controller configured to generate and to output a control message for the other communication node that allocates communications resources within a plurality of subframes over which the communication node will transmit at least one codeword in each subframe for the other communication node;

a transceiver configured to transmit the codewords to the other communication node using the allocated communications resources within the plurality of subframes, and receive, from the other communication node, ACK/NACK feedback for each codeword indicating acknowledgment of receipt or non-receipt of the codeword, wherein the transceiver is further configured to receive, during a subframe, aggregated ACK/NACK feedback from the other communication node indicating acknowledgment of receipt or non-receipt of each of a plurality of codewords transmitted by the communication node in different subframes, and process the aggregated ACK/NACK feedback and to cause any codewords that were not received to be retransmitted to the other communication node, and wherein the aggregated ACK/NACK feedback comprises an order of subframes concerned with Hybrid Acknowledge Repeat Request (HARQ) processes.

23. A non-transitory computer-readable program recording medium comprising computer implementable instructions for causing a programmable communications device to become configured as the communication node of claim 1.

* * * * *